S. L. YOUNG.
Cultivators.

No. 136,297.

Patented Feb. 25, 1873.

Witnesses:
E. Wolff
C. Sedgwick

Inventor:
S. L. Young
per
Attorneys.

UNITED STATES PATENT OFFICE.

SINGLETON L. YOUNG, OF SCOTTVILLE, ILLINOIS.

IMPROVEMENT IN CULTIVATORS.

Specification forming part of Letters Patent No. 136,297, dated February 25, 1873.

*To all whom it may concern:*

Figure 1:
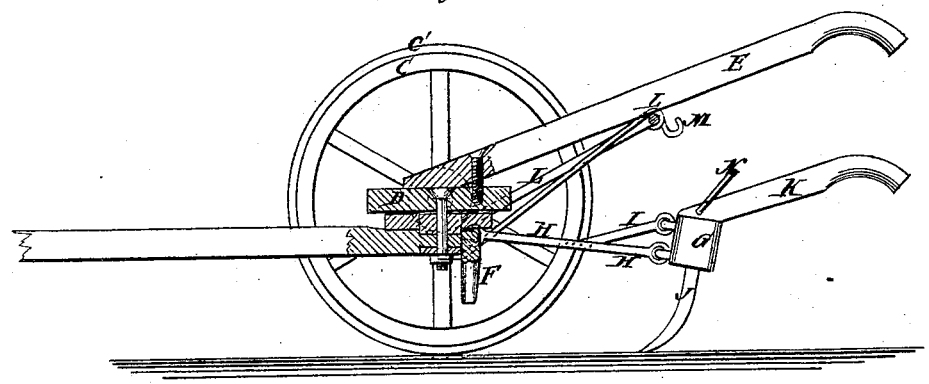
Figure 2:
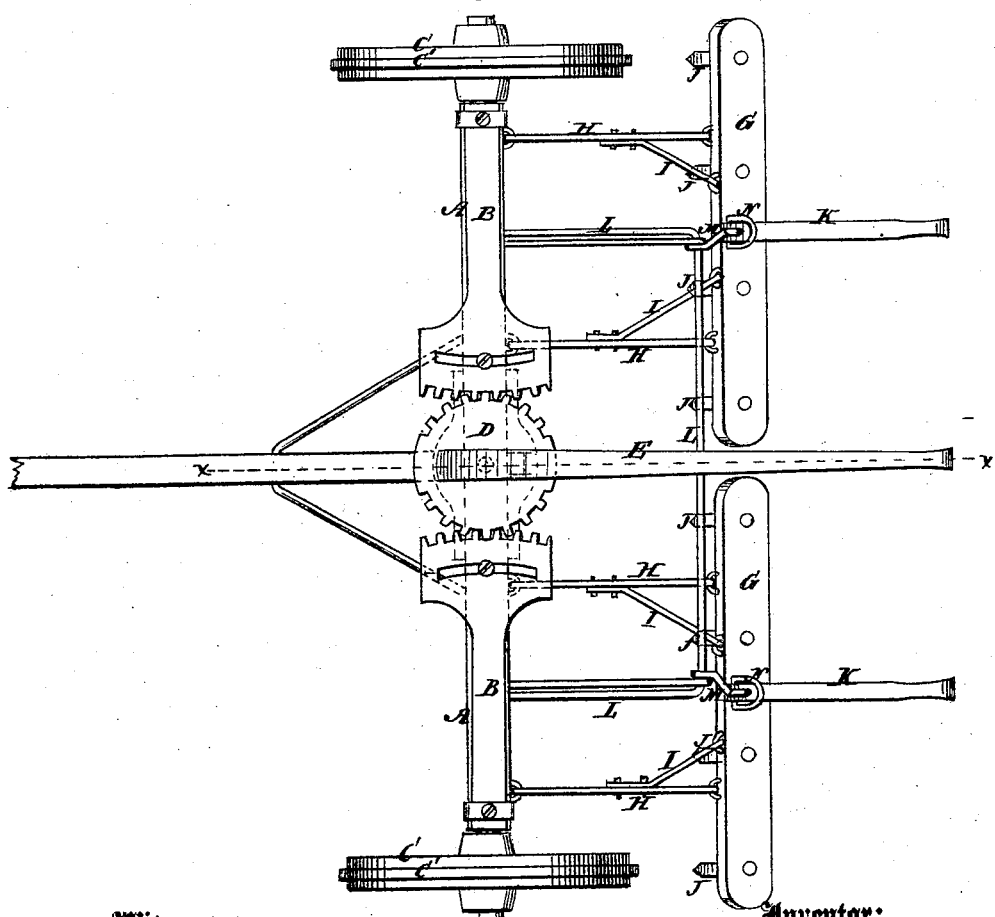

Be it known that I, SINGLETON LEE YOUNG, of Scottville, in the county of Macoupin and State of Illinois, have invented a new and useful Improvement in Wheat-Cultivator, of which the following is a specification:

In the accompanying drawing, Figure 1 is a detail section of my improved cultivator taken through the line $x\,x$, Fig. 2. Fig. 2 is a top view of the same.

Similar letters of reference indicate corresponding parts.

The invention consists in the improvement of cultivators, as hereinafter fully described and pointed out in claims.

A is the axle-tree, to the upper side of the ends of which are pivoted the axle-arms B, upon the journals of which revolve the wheels C. The wheels C are made with a flange, $c'$, upon the center of their rims to prevent them from slipping laterally upon the ground, and to cause them to operate more promptly in guiding the plow. The connection between the axle-arms B and the ends of the axle-tree A is strengthened by a band passing around said axle-arms and around the ends of said axle-tree, as shown in Fig. 2. The inner ends of the axle-arms B are made wide and have transverse slots formed in them curved upon the arcs of circles, having their centers at the pivoting points of said arms. The edges of the wide inner ends of the axle-arms B are curved upon arcs concentric with the slots in said ends, and have teeth formed in them, which mesh into the teeth of the gear-wheel D, pivoted to the center of the axle-tree A, so that by turning the said wheel D in one or the other direction the direction of the wheels C, and consequently of the machine, will be changed.

To the gear-wheel D is rigidly attached a rearwardly-projecting handle, E, by means of which the plowman can readily turn the said wheel to guide the machine. The plowman is aided in guiding the machine by the downwardly-projecting pointer F, attached to the center of the axle-tree A.

G G are the plow-beams, of which I prefer to use two, placed end to end, and each of which is connected with the axle-tree A by two draft-rods, H, the forward ends of which are pivoted to the axle-tree A, and their rear ends are pivoted to the forward side of the beams G near their lower edge. I are braces, the rear ends of which are pivoted to the forward side of the beams G near their upper edge. The forward ends of the braces I are secured to the sides of the draft-bars H, several holes being formed in the said end of the braces to receive the fastening pin or bolt, so that by adjusting the relative length of the draft-rods and braces the inclination or pitch of the plows may be adjusted at will. J are the plows or cultivator-teeth, four of which are designed to be attached to each beam G to correspond with the eight flukes of the drill. To each of the beams G is attached a handle, K, for convenience in raising the plows from the ground when desired.

The middle part of the gear-wheel handle E rests upon the rod L, the ends of which are bent inward and are secured to the axle-tree A, and may be strengthened by braces, if desired.

To the angles of the rod L are attached hooks, M, to receive the loops N, attached to the beams G or handles K to support the plows away from the ground when turning or passing from place to place.

Having thus described my invention, I claim as new and desire to secure by Letters Patent—

1. The combination of the lever E having pinion D on the lower end, and the axle-arms B B having racks on their inner ends, arranged on the axle-trees A of a wheel-cultivator, as and for the purpose described.

2. The device B B D E, combined with the guide F pendent from the middle of the axle-tree, as and for the purpose set forth.

3. The draft-bars H and adjustable braces I, combined with and pivoted to beam A, as and for the purpose specified.

SINGLETON L. YOUNG.

Witnesses:
  JOHN P. GOBBLE,
  WILLIAM H. CRAYN.